May 30, 1939. H. WEBER 2,160,298
METHOD OF MAKING FASTENERS
Filed Feb. 21, 1938
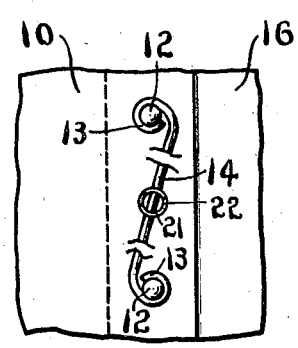
FIG.1.
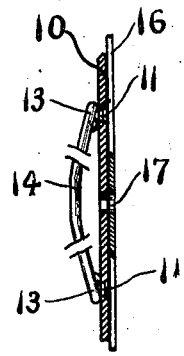
FIG.2.
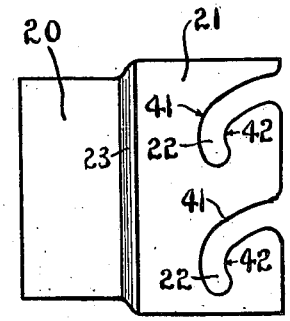
FIG.3.
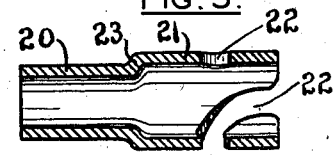
FIG.4.
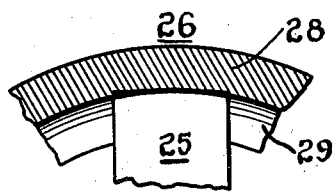
FIG.9.
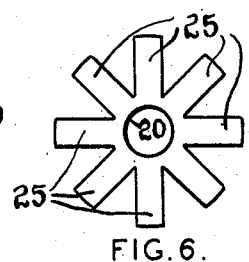
FIG.6.
FIG.5.
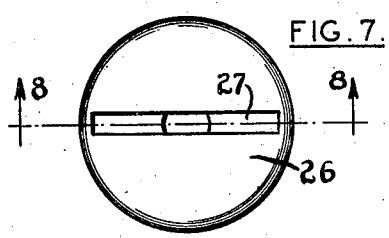
FIG.7.
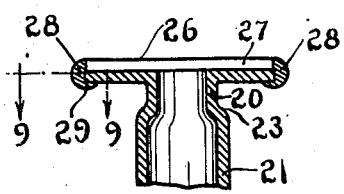
FIG.8.
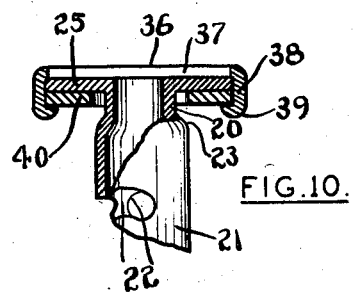
FIG.10.
INVENTOR.
HERMAN WEBER
BY
Thomas G. Boman.
ATTORNEY.

Patented May 30, 1939

2,160,298

UNITED STATES PATENT OFFICE 2,160,298

METHOD OF MAKING FASTENERS

Herman Weber, Kalamazoo, Mich., assignor to Shakespeare Products Company, Kalamazoo, Mich., a corporation of Michigan Application February 21, 1938, Serial No. 191,739

8 Claims. (Cl. 29—148)

My invention relates generally to a method of manufacturing a fastening appliance.

As will be understood by those skilled in this art, the structures disclosed in the three Dzus patents, Nos. 1,955,740, 1,986,329, 2,054,519, are structures which require considerable machine work for their manufacture and consequently one of the objects of the present invention is to greatly reduce the cost of manufacturing articles of this kind. In other words, calling attention to the patent to Johnson, No. 2,087,204, applicant has, similarly to Johnson, created a new and novel method of manufacturing this article which will not only lower the cost of its production but will also result in a more uniform and better product.

Another object is to utilize a stamping for the head portion of the structure, this head being novelly fastened to the several radial fingers by spinning around their ends whereby an extremely rigid and sturdy connection is obtained. An additional advantage lies in the bead formed, this bead contacting the outer face of the plate which is being held.

Yet another advantage lies in my integral construction of the main body, this making for both quick construction and sturdy construction. Also, the restricted neck portion, this being desirable, is easily formed without lathe or machine work.

Further objects and advantages of my invention and its distinguishing features will appear when the following specification is read in connection with the accompanying drawing, in which;

Fig. 1 is a rear or bottom view of a complete installation, including my improved fastening member.

Fig. 2 is a side view of Fig. 1, parts being broken away to expedite the showing and also the rotative part of the fastener being omitted.

Fig. 3 is the blank from which the main part of the fastener is formed.

Fig. 4 is a longitudinal section through the blank after it has been rolled to cylindrical shape.

Fig. 5 illustrates a continuation of the process, this view showing the smaller end bent radially outward.

Fig. 6 is an end view of Fig. 5.

Fig. 7 shows the actuating disc member attached to the fingers of the cylinder.

Fig. 8 is a sectional view taken on the line 8—8 of Fig. 7 as indicated by the arrows.

Fig. 9 is an enlarged fragmentary view taken along the line 9—9 of Fig. 8, as indicated by the arrows.

Fig. 10 is a view, similar to Fig. 8, showing a modification of my invention. The lower portions of both Figs. 8 and 10 are omitted as being unnecessary.

Similar numerals refer to similar parts throughout the several views.

As shown in Figs. 1 and 2, numeral 10 indicates a stationary plate having countersunk rivet holes 11 for receiving the rivets 12. These rivets also pass through the loops 13 formed at the ends of the spring 14. Thus the spring is attached to the plate 10. The spring is so formed as to yield toward and away from the plane of the plate and also to turn upon its rivets as necessary to permit the aforesaid movement.

A second plate 16 is adapted to be positioned alongside of the first plate, these plates having alined openings to form the hole 17. It is through this hole that the stem of my improved fastener passes, the head thereof resting against the outer face of the plate 16.

As illustrated in Fig. 1, the medial portion of the spring 14 passes through and is locked within the stem of my improved appliance.

Referring to Fig. 3, a plate is blanked and shouldered as shown, being of generally rectangular form, having a smaller end 20 and a larger end 21. The latter end is stamped as shown to form slots 22. Fig. 3 illustrates an inside view of the plate before it has been drawn and rolled to the cylindrical form shown in Fig. 4. As shown, the article at this stage has two diameters connected by a shoulder 23.

The next step, see Figs. 5 and 6, is to form or flare the extreme end of the smaller cylinder 20 outwardly to form the fingers 25. During this step it is necessary to separate the several parts as shown to form the fingers.

As shown in Figs. 7 and 8, 26 is a disc formed with a slot 27 to receive a turning tool such as a screwdriver. This disc is positioned adjacent the several fingers 25, overlapping them somewhat, and is then turned and beaded so as to extend around the ends thereof as at 28. The terminals portions 29 are return formed as shown and this annular part 29 forms the seat against the plate 16. Thus an even contact is had. It is to be understood that the outer face of the disc 26 may be finished as desired to present a pleasing and neat appearance.

Fig. 9 discloses the type of connection between each of the several fingers and the disc 26. The extreme outer corners of the finger bite into the disc and prevent any turning between the disc and the stem or body. Thus a powerful twisting action can be applied through the slot 27 to the main body of the device. Also, the fingers 25 may tend to remain slightly bowed as was their original rolled shape and this causes an additional biting action which makes for locking.

Fig. 10 illustrates a modified form in which a washer 40 is located on the inner side of the fingers 25 to reenforce and stiffen them. The disc 36, with its slot 37, must consequently be made somewhat larger to permit the rim 38 and bead 39 to be formed therefrom as shown. The slots 22 and the remainder of the structure in this modification is the same as the construction previously explained.

In operation, the structure is inserted through the hole 17, see Fig. 2, and the medial part of the spring 14 seats in the outermost portions of the slots 22. Rotation of the body is caused by a tool in the slot 27 or 37 and this causes the longer sides 41 of the slots to cam the spring further into the slots until it passes rise or shoulder 42 whereupon it tends to continue against the closed ends of the slots and remain in that position. Thus locking thereof is obtained.

While I have illustrated and described a preferred form of my invention, I do not wish to be limited by such description, since the scope of my invention is best defined by the following claims.

I claim:

1. The method of making a fastener member of the class described which comprises cutting a blank to substantially rectangular shape, drawing said blank and also rolling the same to form integrally connected cylinders of different diameters and a pair of spirally extending slots leading from the larger open end of the joined cylinders, slitting the smaller end axially at a number of places and bending and forming the smaller end so that the parts between the slits extend substantially radially and securing an actuating member to the radially extending portions.

2. The method as set forth in claim 1 in which the actuating member is bent to contact both axially extending faces of the radial portions for the purpose described.

3. The manner of manufacturing an article of the class described which comprises forming a blank of substantially rectangular shape, drawing said blank to form a cylinder having a pair of inwardly extending slots from one end thereof, slitting and bending the portions between the slits of the other end of said cylinder so that a plurality of substantially radially extending fingers are had and then securing an actuating member to the said fingers.

4. The method of forming a fastening device with a reduced portion between its ends comprising, cutting a substantially rectangular sheet of material which has a slot extending into the same from one end thereof and the other end of said blank reduced in width for a distance, bending the same to endless shape or into a cylinder of two different diameters, the said slot extending inwardly from one end of the cylinder, providing an actuating member adjacent the other end of the cylinder, fabricating the cylinder for connection to the actuating member and then connecting the actuating member onto the cylinder.

5. The method of manufacturing an article as described comprising, cutting a blank of flat metal to predetermined shape, stamping an offset or shoulder intermediate its ends to form two substantially rectangular portions, rolling the entire blank to such a diameter as to produce a double diametered cylinder, splitting and flaring one end thereof and beading a second piece of metal around said flared portion.

6. The method as set forth in claim 5 in which the said second piece of metal is punched medially to form a slot prior to its attachment.

7. The method as set forth in claim 5 in which a washer, having a hole of sufficient diameter to receive the unflared end of the cylinder, is slid thereover and against the said flared portion, and in which the second piece of metal is also beaded therearound.

8. The method of manufacturing an article as described comprising, cutting a blank of flat metal to predetermined shape, rolling the entire blank to such a diameter as to produce a cylinder, splitting and flaring one end thereof, providing a washer having a hole of sufficient diameter to receive the unflared end of the cylinder and sliding the same thereover against the flared portion and beading a second piece of metal around both the flared portion and the washer.

HERMAN WEBER.